US005170178A

United States Patent [19]

Yokoyama

[11] Patent Number: 5,170,178

[45] Date of Patent: Dec. 8, 1992

[54] THERMAL TRANSFER RECORDING APPARATUS

[75] Inventor: Takayuki Yokoyama, Yokohama, Japan

[73] Assignee: Minolta Camera Kabushiki Kaisha, Osaka, Japan

[21] Appl. No.: 857,244

[22] Filed: Mar. 25, 1992

[30] Foreign Application Priority Data

Mar. 26, 1991 [JP] Japan .................................... 3-61425
Sep. 11, 1991 [JP] Japan .................................... 3-231361

[51] Int. Cl.[5] ............................................ G01D 15/10
[52] U.S. Cl. .................................................. 346/76 L
[58] Field of Search ................. 346/76 L, 160, 139 R, 346/108

[56] References Cited

U.S. PATENT DOCUMENTS

| | | | |
|---|---|---|---|
| 4,691,212 | 9/1987 | Solcz et al. | 346/108 |
| 4,772,582 | 9/1988 | DeBoer | 503/227 |
| 4,876,235 | 10/1989 | DeBoer | 503/227 |
| 4,903,042 | 2/1990 | Käufl et al. | 346/76 L |
| 5,005,993 | 4/1991 | Ohno et al. | 346/76 PH X |

FOREIGN PATENT DOCUMENTS

| | | | |
|---|---|---|---|
| 8402400 | 6/1984 | PCT Int'l Appl. | 346/160 |
| 8807450 | 10/1988 | PCT Int'l Appl. | 346/76 L |

*Primary Examiner*—Benjamin R. Fuller
*Assistant Examiner*—David Yockey
*Attorney, Agent, or Firm*—Willian Brinks Olds Hofer Gilson & Lione

[57] ABSTRACT

A thermal transfer recording apparatus for thermally transferring ink to an image recording paper via a laser beam. In the thermal transfer recording apparatus, at least one of the opposing surfaces of a print head and a platen is curved, and a transfer portion is provided on the print head at a position displaced a predetermined amount from a nip portion which is formed by the print head and the platen such that an image is formed on a recording paper without the recording paper contacting an ink film. With such an arrangement, voids produced in forming images on image recording paper are prevented and it becomes possible to form images on image recording paper without image irregularities.

Further, by providing a removed portion on the print head relative to the transfer portion in the above thermal transfer recording apparatus so as to accomplish transfer without both sides of the ink film making contact with both the print head and the image recording paper, it becomes possible to minimize the light energy of the laser beam used to expose the ink film.

10 Claims, 8 Drawing Sheets

THERMAL TRANSFER RECORDING APPARATUS

BACKGROUND OF THE INVENTION

1. FIELD OF THE INVENTION

The present invention relates to a thermal transfer recording apparatus for forming images on an image recording paper by feeding an ink film and an image recording paper between a platen and an print head and transferring the ink from said ink film onto the image recording paper.

2. DESCRIPTION OF THE RELATED ART

The ink films used by thermal transfer recording apparatus include fusion type films wherein a print head thermally fuses the ink of an ink film so as to adhere said ink onto an image recording paper, sublimation type films wherein a print head sublimates the ink of an ink film so as to adhere said ink onto an image recording paper, and the like. U.S. Pat. No. 4,876,235 discloses a sublimation type ink film wherein the ink of an ink and the image recording paper is prevented via the presence of spacer beads on either said ink film or said image recording paper.

In thermal transfer recording apparatus using conventional thermal sublimation type ink film, a large pressure is applied to the image recording paper and the ink film via a print head and platen.

However, conventional thermal transfer recording apparatus using sublimation type ink film typically produce white-spot phenomenon called voids due to surface irregularities of about 2 $\mu m$ on the surface of the image recording paper, and said voids are produced even when an ink of laser-induced ink sublimation type is used. The occurrence of the aforesaid voids is thought to be caused by the relatively low dye transfer efficiency of the concave portions of the aforesaid surface irregularities of the image recording paper due to gaps between said concavities and the ink film compared with the relatively high dye transfer efficiency of the convex portions of said surface irregularities.

Furthermore, since the dye layer of the ink film contains binding agents and the like in addition to the dye, said binding agents and the like are transferred to the image recording paper as impurities which may cause image irregularities. Accordingly, a major technical problem today is preventing the production of the aforementioned voids as well as preventing the occurrence of irregularities in an image caused by the transfer of the aforesaid impurities so as to allow the reproduction of high quality images on an image recording paper.

Further, transfer efficiency could be improved if only the light energy of the laser beam used to expose the ink film to effect sublimation of the ink could be minimized. The present inventors conducted various studies to achieve improved transfer efficiency, and have determined that heretofore the ink film is fed along the feed guide surface of the print head in a state of contact therewith so that the thermal energy generated by photothermal conversion in the exposure of film is adsorbed by the print head. Heretofore, the adsorbed excess energy has unavoidably augmented laser intensity.

SUMMARY OF THE INVENTION

A main object of the present invention is to provide a thermal transfer recording apparatus capable of forming high quality images on image recording paper.

Another object of the present invention is to provide a thermal transfer recording apparatus capable of preventing the previously described voids produced in forming images on image recording paper.

A further object of the present invention is to provide a thermal transfer recording apparatus capable forming images on image recording paper without image irregularities.

A still further object of the present invention is to provide a thermal transfer recording apparatus having improved transfer efficiency.

These and other objects of the invention are achieved by providing a thermal transfer recording apparatus for thermally transferring ink to an image recording paper via a laser beam, said thermal transfer recording apparatus comprising:

print head;

platen provided opposite said print head;

nip portion formed by said print head and said platen so as to have the image recording paper and the ink film disposed therebetween; and transfer portion for exposing the ink film via a laser beam, said transfer portion being disposed above the print head at a position displaced a predetermined amount from the nip portion.

These and other objects of the invention are further achieved by providing a thermal transfer recording apparatus for thermally transferring ink to an image recording paper via a laser beam, said thermal transfer recording apparatus comprising:

print head;

platen provided opposite said print head;

nip portion formed by said print head and said platen so as to have the image recording paper and the ink film disposed therebetween;

transfer portion for exposing the ink film via a laser beam, said transfer portion being removed from said nip portion and disposed at a position providing a space between the ink film and the image recording paper; and concave portion provided relative to the transfer portion above the print head for accomplishing transfers without either side of the ink film making contact with either the print head or the image recording paper.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

A detailed description of the present invention follows hereinafter with reference to the accompanying drawings.

Figure 1:
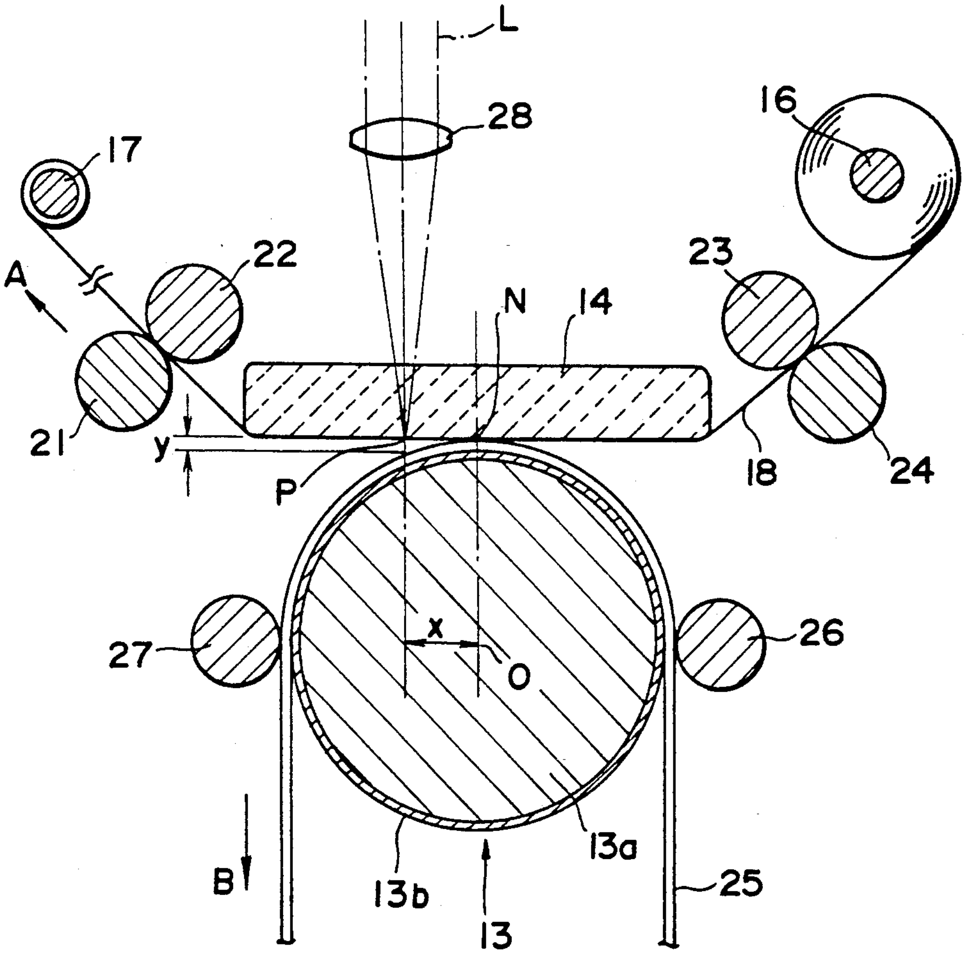
FIG. 1 is a section view showing a first embodiment of the thermal transfer recording apparatus of the present invention.
Figure 2:
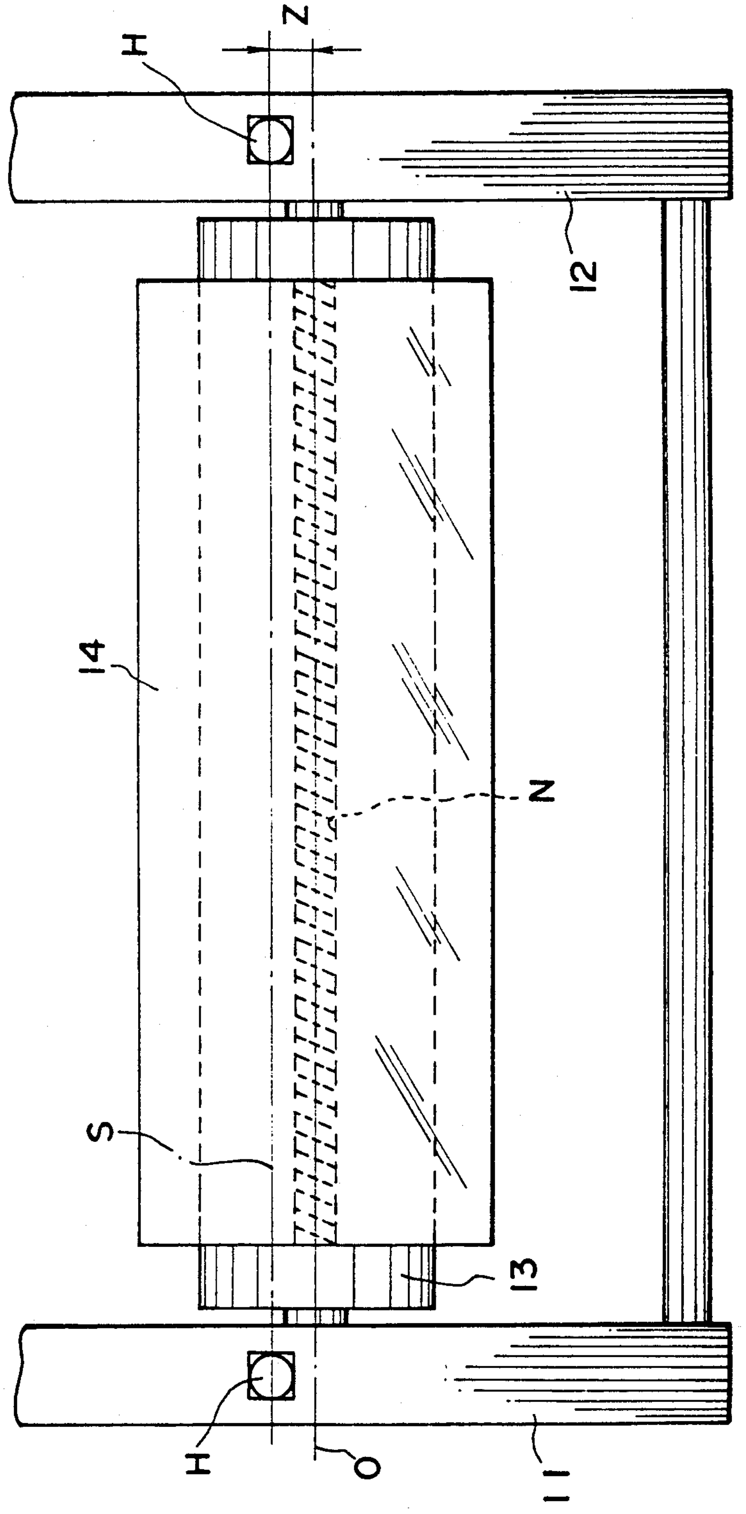
FIG. 2 is a top plan view of the embodiment shown in FIG. 1 with the ink film omitted.
Figure 3:
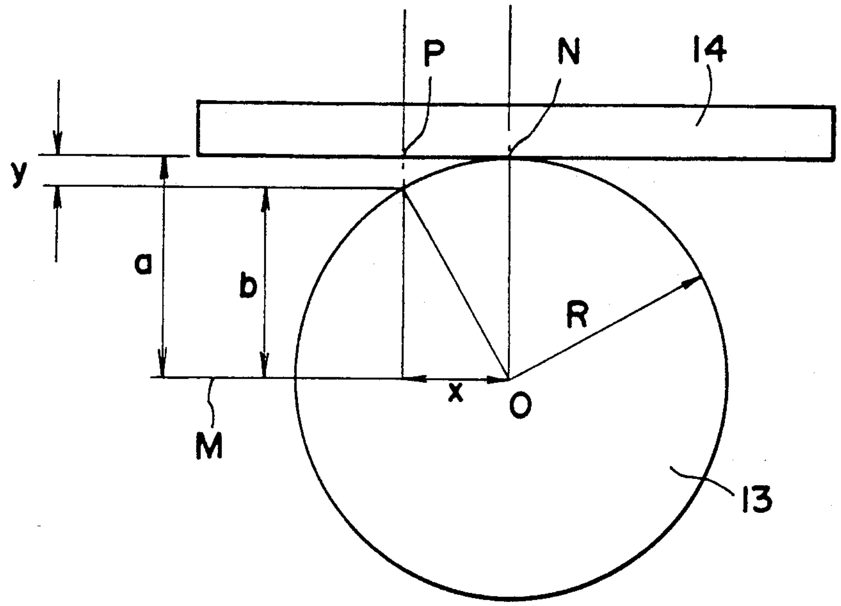
FIG. 3 is an illustration showing the relationship between the gap and the position of the transfer portion with respect to the center of the nip in the thermal transfer recording apparatus shown in FIGS. 1 and 2.

FIGS. 1 through 3 show a first embodiment of the thermal transfer recording apparatus of the present invention. As shown in FIG. 2, the two supporting panels 11 and 12 are arranged so as to be mutually separated by a predetermined space, and the platen roller 13 is mounted on said supporting panels 11 and 12 so as to be rotatable through bearings not shown in the drawing. The platen roller 13 is driven by a motor (not illustrated), and has a core member 13*a* with a rubber layer 13*b* superimposed thereon, as shown in FIG. 1; the rotational center of the platen roller 13 is designated by the reference mark 0. The thickness of the rubber layer 13*b* is about 1 mm, and a rubber material having a hardness of 60° by Askar standards so as to improve the roundness of said roller platen 13. A glass print head 14 is provided adjacent to the roller platen 13. In the drawing, the print head 14 is positioned on the top side of the platen roller 13.

The ink film 18 is guided by the bottom surface of the print head 14, i.e., the surface opposite the platen roller 13, as it is fed out from a feed roller 16 and wound around a winding roller 17. The ink film 18 is driven via a rubber pinch roller 21 and a capstan roller 22 which applies pressure on the pinch roller 21 through the ink film 18, so as to move the ink film 18 in the arrow A direction in FIG. 1. The aforesaid rollers 21 and 22 are positioned between the aforementioned winding roller 17 and the print head 14. A metallic tension roller 23 and a rubber tension roller 24, which applies pressure on said tension roller 23 through the ink film 18, are provided between the print head 14 and the feed roller 16. These rollers 23 and 24 are provided with internally installed sliding clutches (not shown in the drawings) to apply a braking force on the ink film 18 to maintain the tension of said ink film 18.

The image recording paper 25 is guided so as to be in contact with the semicircular portion of the platen roller 13 opposite the print heat 14. The image recording paper 25 is fed synchronously with the movement of the ink film 18 via the rotation of the platen roller 13. Two sheet pressing rollers 26 and 27 are provided at 180° phase relative to the rotational center of the platen roller 13, and press against the platen roller 13 through the image-receiving sheet 25. The feed direction of the image-receiving sheet 25 coincides with the rotation of the platen roller 13 and is indicated by the arrow B.

The bottom surface of the print head 14, i.e., the surface opposite the platen roller 13, is flat as shown in the drawing, whereas the upper surface of the platen roller 13 opposite the print head 14 is a circular arc. Accordingly, when the platen roller 13 and the print head 14 make mutual contact, a nip portion N is formed. The width of the aforesaid nip portion N is set at about 1 mm. The ink film 18 is guided by the flat surface of the print head 14 as said film is fed, and the image-receiving sheet 25 is guided by the opposing surface having a circular arc-like shape as said sheet is fed. The film 18 and the sheet 25 are transported and mutually approach the nip portion N, and make mutual contact at the nip portion N, and thereafter said film 18 and said sheet 25 mutually separate after passing this point.

As shown in FIG. 1, the transfer portion P is provided at a position removed from the center of the nip portion N by the distance X downstream in the transport direction of the image-receiving sheet 25 and the ink film 18. At the transfer portion P, the laser beam L having a wavelength of 810 nm is set so as to have a focal point at the photothermal conversion layer of the ink film 18 via the optical system 28. A high-output semiconductor laser, for example, Sony (K.K.) model SLD304XT may be used as the laser light source. A metallic vacuum deposition layer or the like is applied to the surface of the print head 14 in an antireflection process so as to minimize the reflection of the laser beam L of the aforementioned wavelength from the surface of the glass print head 14. On the other hand, it is desirable that the platen roller 13 experience a temperature elevation to a predetermined temperature so as to improve dye-receiving efficiency of the image-receiving sheet 25, i.e., improve image density.

Thus, by providing the transfer portion P at a position removed from the center of the nip portion N, an air gap of dimension Y is formed between the ink film 18 and the image-receiving sheet 25 in the transfer portion, such that the ink of the ink film 18 is transferred to the image-receiving sheet 25 in a noncontact state. The value of the aforesaid air gap Y is regulated by the distance X between the rotational center 0 of the platen roller 13 and the optical axis of the laser beam L, i.e., the transfer portion P. In the illustrated case, the value Y is regulated within the range $0<Y<200$ μm. It is desirable that the value Y be set within the range $5<Y<50$ μm so as to form high quality images on the image-receiving sheet 25.

Figure 4:
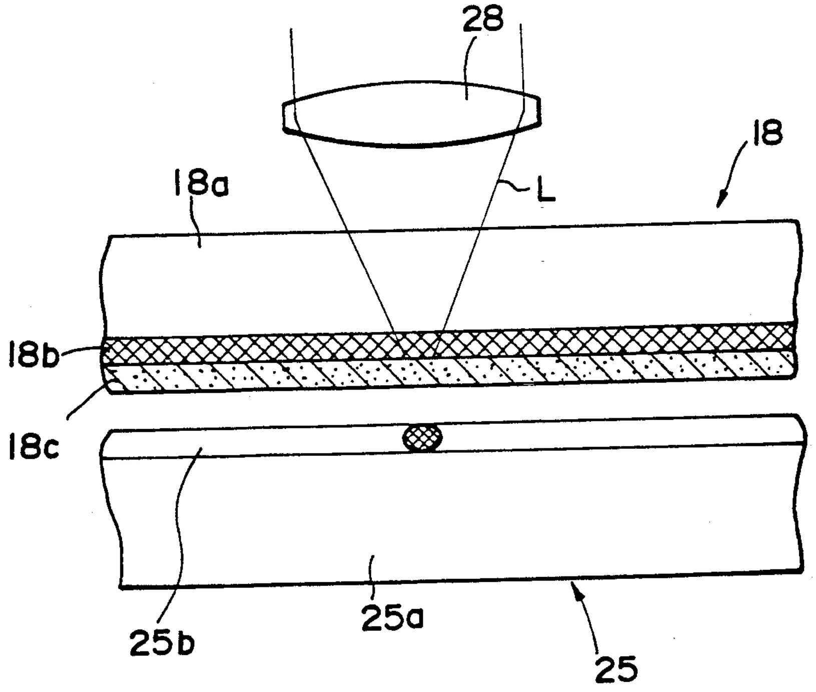
FIG. 4 is a section view showing the structures of the ink film and the image recording paper.

FIG. 4 is an illustration showing the structures of the ink film 18 and the image-receiving sheet 25. The ink film 18 may comprise, for example, a base film 18*a* formed of polyethylene terephthalate which only slightly adsorbs the laser light L of the aforesaid wavelength, photothermal conversion layer 18*b* formed of, for example, high adsorption carbon or the like superimposed on the base film 18*a*, and a color layer 18*c* having a dye dispersed in a polymeric binding material superimposed on the layer 18*b*. On the other hand, the image receiving sheet 25 may comprise, for example, a substrate material 25*a* of polyester, condensed paper or the like, coated with an image-receiving layer 25*b* containing a dye such as, for example, polycarbonate, polyurethane and the like.

When the focal point of the laser light L is set on the photothermal conversion layer 18*b* of the ink film 18, the photothermal conversion agent emits heat which is transmitted to the coloring layer 18*c*. When the sublimation dye in the color layer is excited by the aforesaid heat, the heretofore solid dye dispersed in the polymeric binding material is vaporized and released therefrom. At this time, the image-receiving layer 25*b* is at an extremely near position, such that the released sublimated dye is trapped in the image-receiving element so as to effectively dye the image-receiving layer 25*b*. After the image-receiving layer 25*b* has been dyed, it is desirable to cool the material to room temperature once. This cooling strengthens the bond between the dye and the image-receiving element, prevents resublimation even if the dye is again heated. This feature is particularly important for color printers capable of making 3∼4 color overlays so as to maintain color balance because the image-receiving sheet 25 is again heated each time another color is adhered.

The sequence for regulating the distance X between the rotational center 0 of the platen roller 13 and the optical axis and the width Y of the air gap is described hereinafter with reference to FIG. 2.

As shown in the drawing, the platen roller 13 and the print head 14 are in a mutually pressing state, and deformation occurs due to the pressure applied on the rubber material 13*b* of the platen roller 13 so as to form a nip portion N having a certain width. Omitted from FIG. 2 are the ink film 18 and the image-receiving sheet 25 transported between the platen roller 13 and the print head 14. Accordingly, in FIG. 2 the image-receiving sheet 25 is assumed to be in a wound state. The photosensors H are mounted on both the support panels 11 and 12 to detect the laser beam L, which scans in the direction of the main scan line S at the position of said photosensors H. The mounted position of the photosensors H is regulated at a distance Z from the rotational center 0 of the platen roller 13.

The width Y of the air gap is determined by the distance Z between the rotational center 0 of the platen roller 13 and the main scan line S. Since width Y of the air gap becomes 0 when the main scan line S is positioned within the nip portion N, the value Z must always be a value greater than ½ the width of the nip portion N.

The regulation of the main scan line position is accomplished by regulating the optical system. At that time, the main scan line S of the scanning laser beam L is made to pass the center of each photosensor H. The photosensors H are set so as to maximize an output voltage when the laser beam L passes horizontally through the center of the element of each photosensor via a means such as providing a slit or the like over the photoreceptor element. Thus, when the main scan line position is regulated such that both right and left photosensors H maximize their respective outputs, the laser beam L results to scan the position of a width Y of the optimum air gap without regulating the positional relationship between the photosensors H and the center 0 of the platen roller 13.

The relationship between the aforesaid values X and Y is described below with reference to FIG. 3. If the radius of the platen roller 13 accommodating the image-receiving sheet 25 in a wound state thereon is designated R, the reference line extending at right angles to a straight line connecting the nip portion N and the center 0 is designated M, the measurement between the line M and the transfer portion P is designated a, and the distance to the intersection of the reference line M and the surface of the image-receiving sheet 25 is designated b, the relationship Y=a−b is obtained. Since a=R, the value of b is determined by the following expression:

$$b=(R^2-X^2)^{\frac{1}{2}}$$

The value of the air gap Y is determined as described above. However, in fact, the concavities formed in the rubber layer 13*b* of the platen roller 13 become a subtracted dimension.

Figure 5:
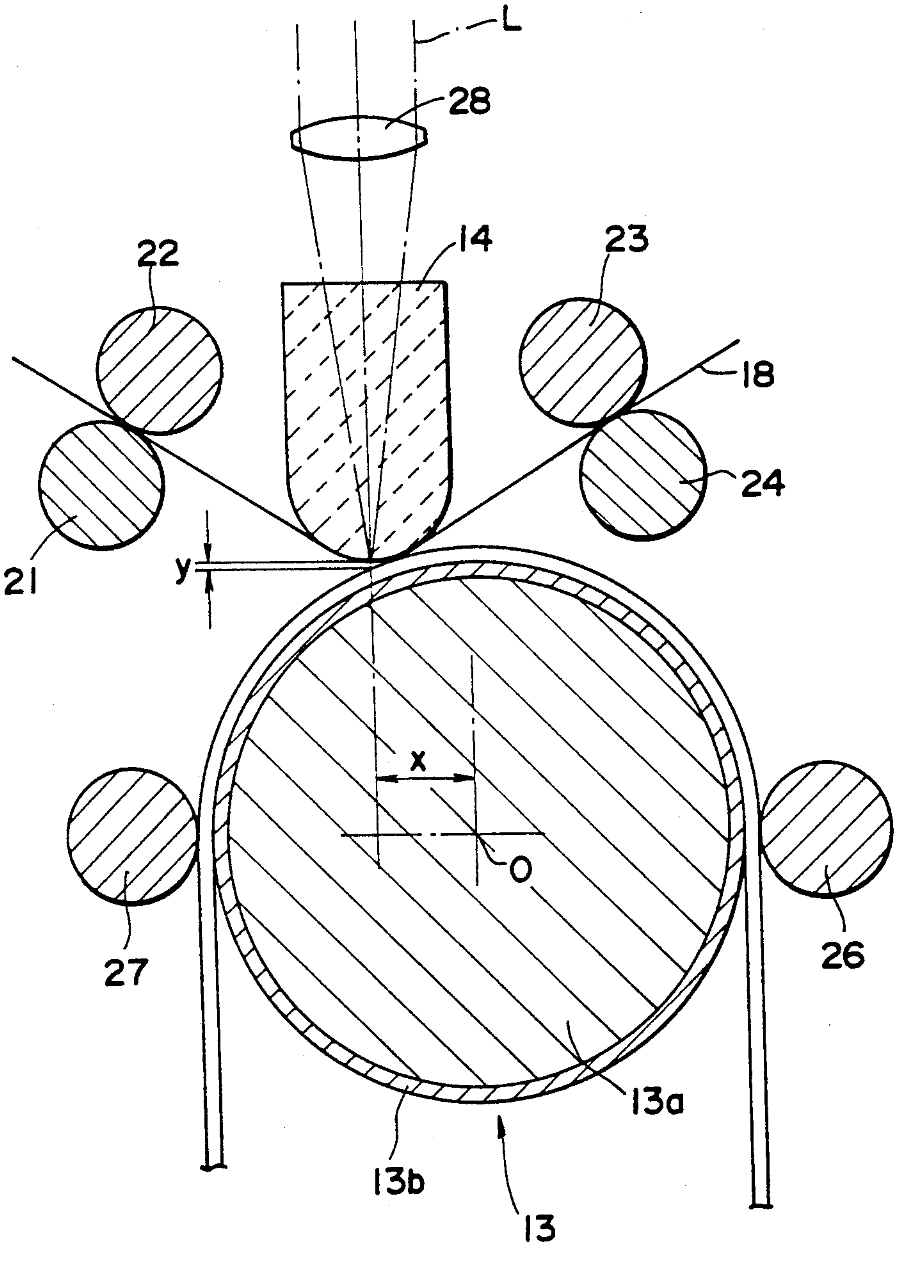
FIG. 5 is a section view showing a second embodiment of the thermal transfer recording apparatus of the present invention.

FIG. 5 is an illustration showing a second embodiment of the thermal transfer recording apparatus of the present invention. In the drawing, like parts of both embodiments are designated by like reference numbers. In the second embodiment, the bottom surface of the print head 14, i.e., the surface opposite the platen roller 13, has a semicircular shape. The present print head 14 has a length greater than the width of the image-receiving sheet 25 in the direction of the main scan line S, just as in the prior embodiment of FIG. 2.

Figure 6:
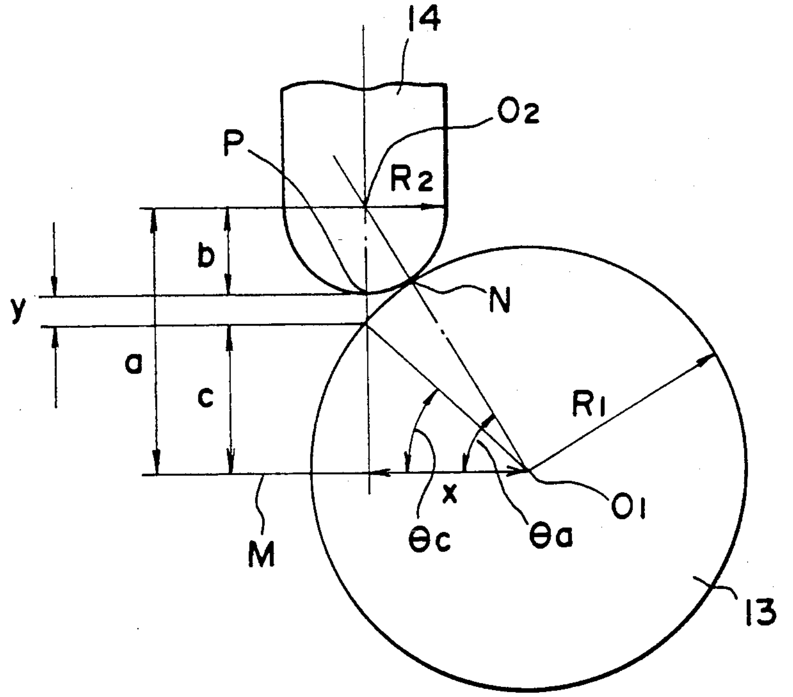
FIG. 6 is an illustration showing the relationship between the gap and the position of the transfer portion with respect to the center of the nip in the thermal transfer recording apparatus shown in FIG. 5.

The print head 14 has the function of pressing the film 18 from the base plane toward the platen roller 13, and the function of focusing the laser beam emitted from the optical system on the photothermal conversion layer of the ink film 18. Since the semicircular surface of the print head 14 makes strong contact with the rear surface of the ink film 18, a hard material is used for the print head 14 or the surface of said print head 14 is subjected to antiabrasion processing. In this case, the relationship between the aforesaid values X and Y is described below with reference to FIG. 6. If the radius of the platen roller 13 accommodating the image-receiving sheet 25 in a wound state thereon is designated R1, the radius of the semicircular plane of the print head 14 is designated R2, the distance between the center 02 of the semicircular plane and the reference line M passing through the rotational center of the platen roller 13 is designated a, the angle formed between the reference line M and a line connecting both centers is designated θa, the angle formed between the line passing through the position corresponding to the transfer portion P on the platen roller 13 and the center 01 and the reference line M is designated θc, the distance between the center 02 and transfer portion P is designated b and the distance between the position corresponding to P on the platen roller 13 and the reference line M is designated c, the expression Y=a−(b+c) is obtained. Since a=X·tan θa b=R2 and c=R1·sin θc, the value of the air gap Y can be determined from the values a, b and c.

Figure 7:
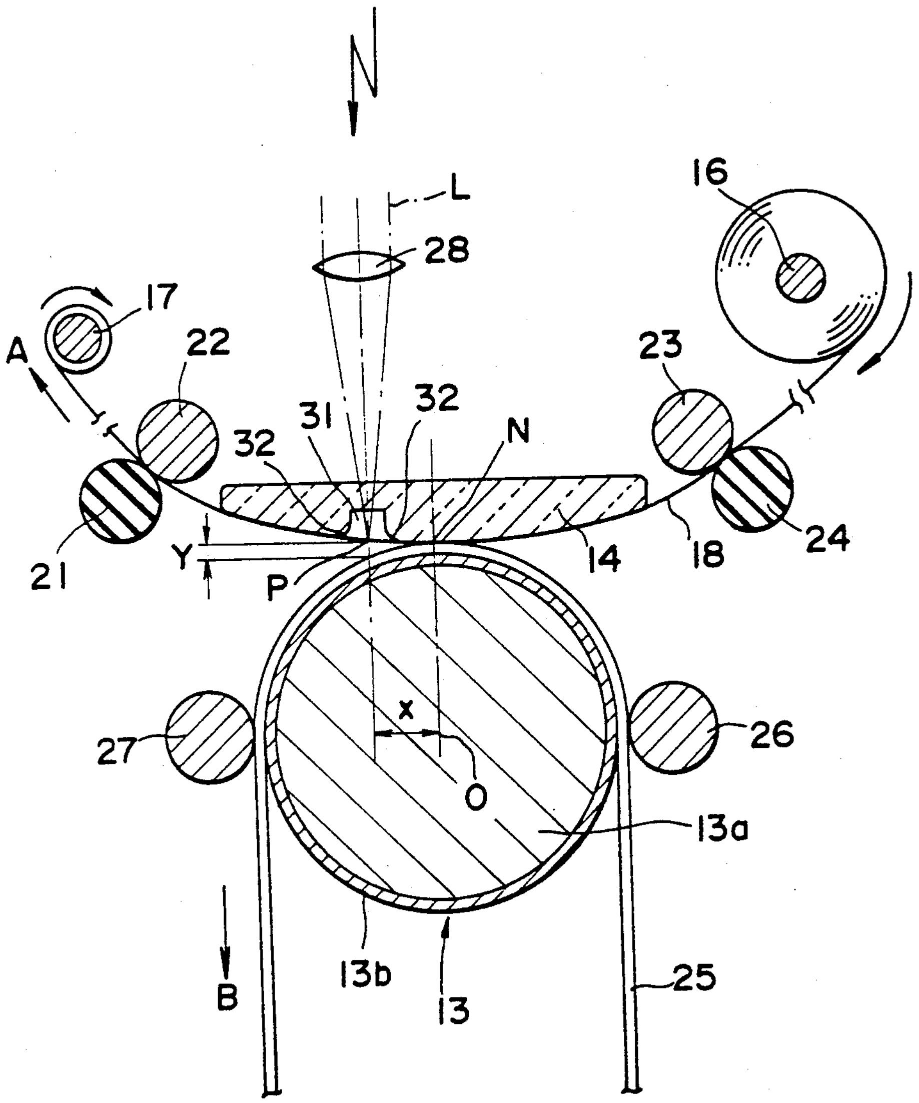
FIG. 7 is a section view showing a third embodiment of the/thermal transfer recording apparatus of the present invention.

FIG. 7 shows a third embodiment of the thermal transfer recording apparatus of the present invention. In the drawing, like parts of the three embodiments are designated by like reference numbers. In this embodiment, the bottom surface of the print head 14, i.e., the feed guide surface which guides the transport of the ink film 18 opposite the platen roller 13, is somewhat curved so as to form a convexity opposite the platen roller 13, as shown in the drawing. Accordingly, wrinkles are not formed when tension is added to the ink film 18, and the ink film 18 achieves superior adhesion to the feed guide surface of the print head.

In the third embodiment, the transfer portion, i.e., the exposure position P, is removed from the center of the nip portion N by the distance X downstream in the transport direction of the image-receiving sheet 25 and the ink film 18. The sequence for regulating the distance X between the center 0 of the platen roller 13 and the optical axis, and the width Y of the air gap is identical to that of the first embodiment.

As shown in FIG. 7, the print head 14 of the present embodiment has a light transmitting concave portion 31 opening onto the feed guide surface and disposed at the exposure position P. The concavity 31 is formed by providing a channel parallel to the rotational center 0 of the platen roller 13 and extending the entire length of the print head 14. Accordingly, when the laser beam L exposes the ink film 18, the transfer is accomplished with the ink film 18 in a free floating state such that neither the front nor back sides of the ink film 18 make contact with either the print head 14 or the image-receiving sheet 25. Therefore, the thermal energy generated by the photothermal conversion within the ink film 18 having a slight heat capacity is consumed as energy for sublimating the ink with superior efficacy and without being adsorbed by the glass print head 14 which has a large heat capacity and maintained at room temperature. The formation of the channel, i.e., the concavity 31, not only improves heat efficiency, but also improves printing speed and prevents a decrease in light transmission caused by damage to and the adherence of impurities on the print head 14 because the ink film 18 is neither in contact with nor creates friction against the print head 14 at the laser beam transmitting portion.

The edge of the opening of the light transmitting concavity 31 has a circular arc-shaped portion 32, as shown in FIG. 7. The arced portion 32 prevents damage to the back side of the ink film 18 and prevents impurities adhering to the ink film 18 from being collected and remained within the concavity 31.

Figure 8:
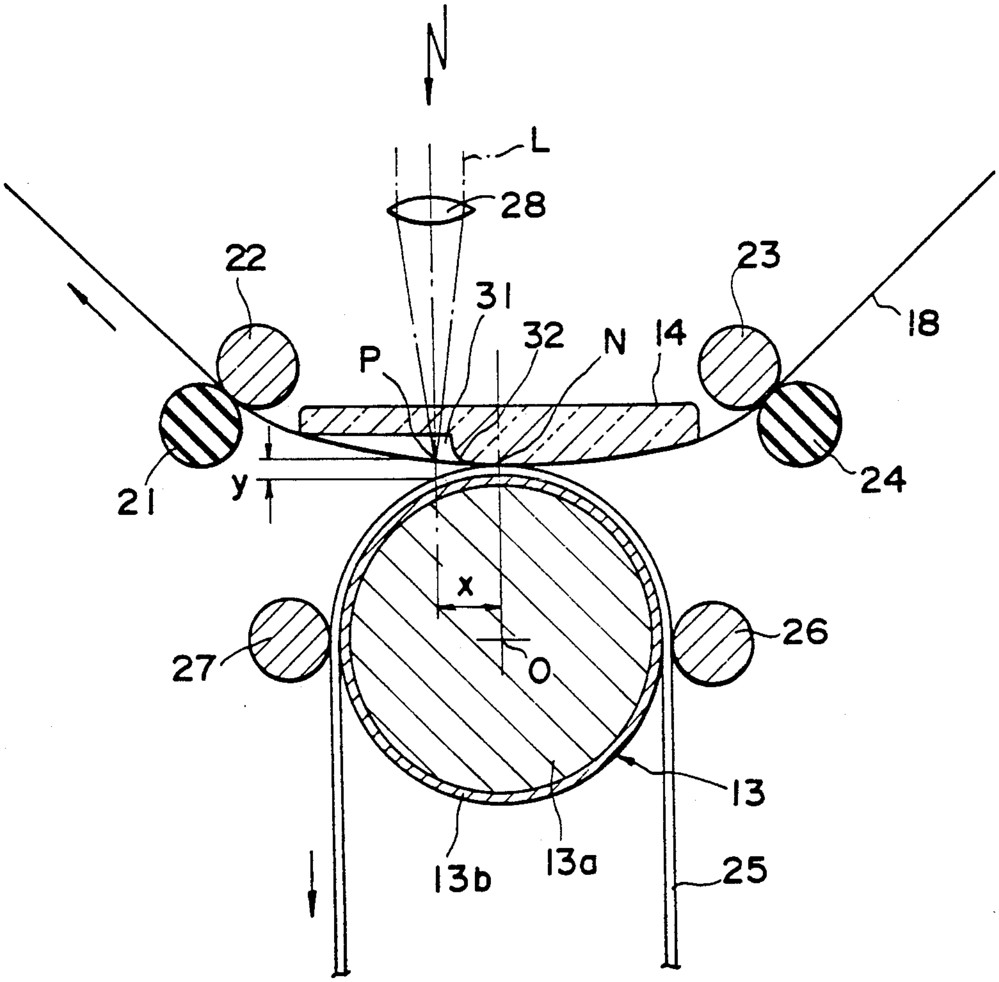
FIG. 8 is a section view showing another embodiment of the thermal transfer recording apparatus of the present invention.
Figure 9:
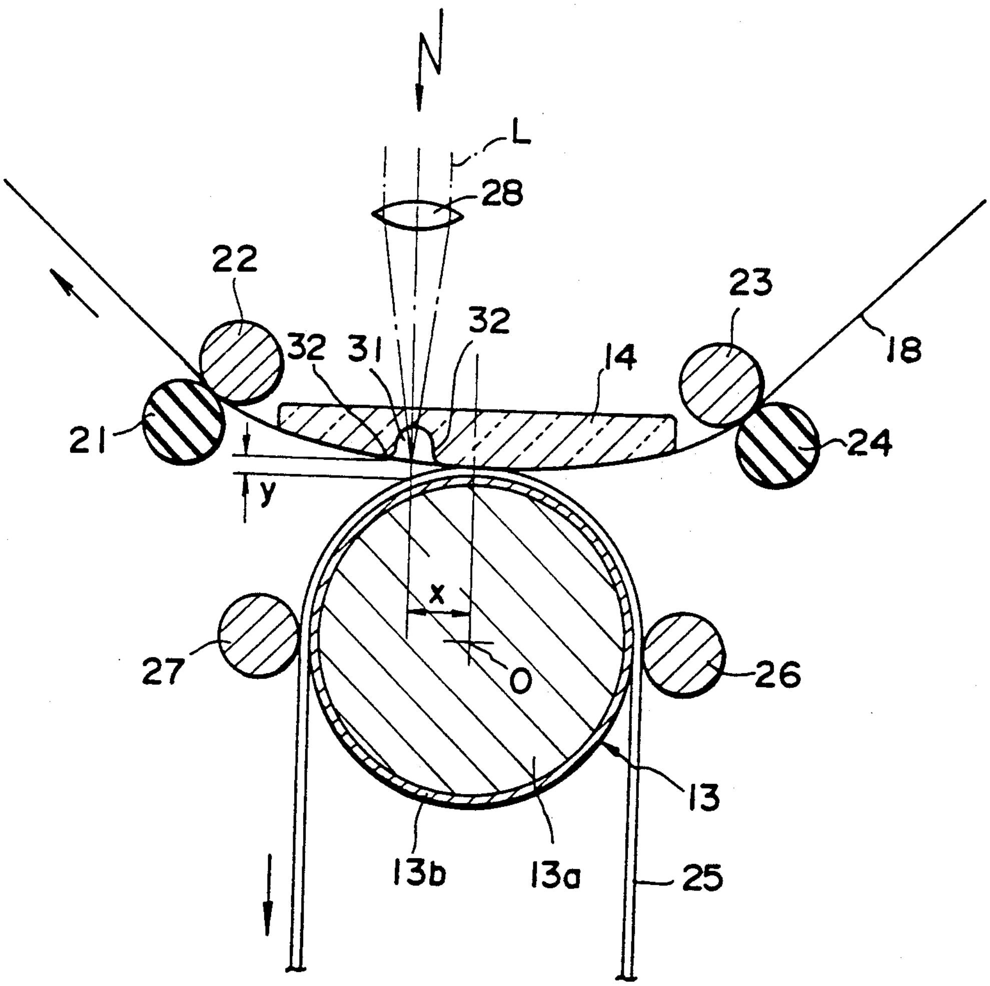
FIG. 9 is a section view showing still another embodiment of the thermal transfer recording apparatus of the present invention.

FIGS. 8 and 9 show other embodiments of the thermal transfer recording apparatus of the present invention. In the drawing, like parts common to the prior embodiments are designated by like reference numbers. In the case of FIG. 8, the light transmitting concavity 31 is formed by providing a stepped portion on the downstream side of the ink film 18 beyond the exposure position P of the print head 14. The formation of the aforementioned stepped portion of concavity 31 is a simpler process than the formation of the channel described in FIG. 7.

The print head 14 shown in FIG. 9 has a light transmitting concave portion 31 formed by a channel connecting the arced surfaces and including the R portion 32. The shape of the aforesaid concave portion 31 may be variously configured insofar as the part transmitting the laser beam L to the ink film 18 is shaped so as to not contact either the image-receiving sheet 25 as the feed guide surface of the print head 14.

The shape of the print head 14 having a concave portion 31 may have a radius of curvature such that the feed guide surface approaches semicircular, or said feed guide surface may be flat.

At least one of the mutually opposing surfaces of the print head 14 and the platen roller 13 forms a circular arc in shape, and the transfer portion P, i.e., the laser beam L exposure portion in the drawing, is removed from the nip portion N, the ink film 18 guided by the print head 14 and the image-receiving sheet 25 guided by the platen roller 13 form the images at a position of mutual separation. Therefore, the dye is transferred with the color layer 18*c* of the ink film 18 and the surface of the image-receiving sheet 25 in a state of mutually noncontact. Accordingly, impurities other than the dye are not transferred to the image-receiving sheet, image irregularities do not occur, and sharp, high quality images can be reproduced. Furthermore, the dimensions of the irregularities on the surface of the image-receiving sheet 25 are relatively smaller compared to the dimensions of the air gap Y so that said irregularities do not produce adverse affects, and high quality images can be reproduced without the voids, i.e., blank spots, commonly produced by conventional contact methods.

Since a heat-producing element is contained in the ink film 18, when the ink film is irradiated by the laser beam heat is effectively transmitted to the sublimation dye even without a large pressure between the print head and the platen, unlike when a thermal head is used. Therefore, the drive system load is reduced, and the apparatus can be realized in a light weight and compact form. Furthermore, the base thickness of the ink film, unlike when the thermal head is used, has no relation to thermal efficiency so that said film base may be thicker for ease of production and ease of handling the ink film within the apparatus.

Furthermore, thermal efficiency was improved because heat was not transmitted from the ink film to the image-receiving sheet 25. In the apparatus shown in FIGS. 7, 8 and 9, a light transmitting concave portion 31 was formed in the print head 14 to produce a free floating state of the ink film 18, such that thermal energy was unable to escape from the ink film to the image-receiving sheet, thereby improving the thermal transfer efficiency of the dye. In conjunction with the improved thermal transfer efficiency, the printing time was reduced. Since the ink film 18 does not contact the print head 14 at the laser exposure position P, the optical elements can be maintained in a clean state for extended periods, and the change of the amount of transmitted light in accordance with time can be markedly suppressed. Since a portion 32 is formed on the edge of the concave portion 31, coating material and impurities scrapped from the back side of the ink film 18 are prevented from being collected in the concave portion 31, thereby not only preventing a reduction in the amount of transmitted light, but also lengthening the maintenance cycle for cleaning the print head 14 and the like.

Although a photothermal conversion layer was included in the ink film 18 in the previously described embodiments, under conditions when the surface opposite the print head 14 is coated with a photothermal conversion layer and caused to generate heat, a conventional ink film may be used which does not contain a photothermal conversion layer. Furthermore, a platen having a flat opposing surface may be used instead of the aforesaid platen roller 13. A heat-producing element may be provided on the surface opposing the print head without heating the ink film via a laser beam. Although the transfer portion P was provided downstream from the nip portion N in the transport direction of the ink film 18 and the image-receiving sheet 25, said transfer portion P may be disposed on the upstream side in the direction of transport. The present invention is also suitable when not using a laser beam as shown in the drawings if the ink is transferred to the image-receiving sheet with the ink film and the image-receiving sheet in a state of mutual noncontact.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal transfer recording apparatus for thermally transferring ink to an image recording paper, said thermal transfer recording apparatus comprising:

a print head along which an ink film is conveyed;

a platen provided opposite said print head for conveying the image recording paper therealong;

a nip portion formed by said print head and said platen so as to have the image recording paper and the ink film disposed therebetween; and a transfer portion for exposing the ink film, said transfer portion being disposed on the print head at a position displaced a predetermined amount from said nip portion such that the image is formed on the recording paper without the recording paper contacting the ink film.

2. The thermal transfer recording apparatus as claimed in claim 1, wherein at least one of opposing surfaces of said print head and said platen is curved.

3. A thermal transfer recording apparatus for thermally transferring ink to an image recording paper by way of a laser beam, said thermal transfer recording apparatus comprising:

a print head along which an ink film is conveyed;

a platen provided opposite said print head for conveying the image recording paper therealong, wherein at least one of the opposing surfaces of said print head and of said platen is curved;

a nip portion formed by said print head and said platen so as to have the image recording paper and the ink film disposed therebetween; and a transfer portion for exposing the ink film by way of the laser beam, said transfer portion being disposed on the print head at a position displaced a predetermined amount from said nip portion such that the recording paper the image is formed on without the recording paper contacting the ink film.

4. The thermal transfer recording apparatus as claimed in claim 3, wherein both opposing surfaces of said print head and a platen are arc-shaped.

5. The thermal transfer recording apparatus as claimed in claim 3, wherein said transfer portion is disposed on a downstream side of said nip portion with respect to a direction of ink film conveyance.

6. The thermal transfer recording apparatus as claimed in claim 3, wherein said print head has a concave portion relative to the transfer portion for accomplishing transfer without sides of the ink film making contact with both the print head and the image recording paper.

7. A thermal transfer recording apparatus for thermally transferring ink to an image recording paper, said thermal transfer recording apparatus comprising:

a print head along which an ink film is conveyed;

a platen provided opposite said print head for conveying the image recording paper therealong;

a nip portion formed by said print head and said platen so as to have the image recording paper and the ink film disposed therebetween;

a transfer portion for exposing the ink film so as to make the ink sublimate and adhere to the recording paper, said transfer portion being displaced from said nip portion and disposed at position providing a space between the ink film and the image recording paper; and a removed portion provided on said print head relative to said transfer portion for accomplishing said transfer without sides of the ink film making contact with the print head and the image recording paper.

8. The thermal transfer recording apparatus as claimed in claim 7, wherein edge portions of said removed portion are arc-shaped.

9. The thermal transfer recording apparatus as claimed in claim 7, wherein said removed portion is formed by providing a stepped portion on a downstream side of said transfer portion with respect to a direction of ink film conveyance.

10. The thermal transfer recording apparatus as claimed in claim 7, wherein said removed portion is formed by a channel connecting arced surfaces.

* * * * *

UNITED STATES PATENT AND TRADEMARK OFFICE
CERTIFICATE OF CORRECTION

PATENT NO. : 5,170,178 Sheet 1 of 2
DATED : December 8, 1992
INVENTOR(S) : Takayuki Yokoyama It is certified that error appears in the above-identified patent and that said Letters Patent is hereby corrected as shown below:

In Col. 1, line 20, between "ink" and "and", insert --film is sublimated via exposure by a laser beam. In the aforesaid ink film adhesion between the ink film--.

In Col. 3, line 6, before "thermal", delete "/".

In Col. 7, line 44, after "25", change "as" to --or--.

In Col. 9, line 33 (Claim 3, line 17), delete "recording paper the".

UNITED STATES PATENT AND TRADEMARK OFFICE
CERTIFICATE OF CORRECTION

PATENT NO. : 5,170,178 Sheet 2 of 2

DATED : December 8, 1992

INVENTOR(S) : Takayuki Yokoyama

It is certified that error appears in the above-identified patent and that said Letters Patent is hereby corrected as shown below:

In Col. 9, line 33 (Claim 3, line 17), after "on", insert --the recording paper--.

In Col. 10, line 6 (Claim 6, line 4), before "transfer", insert --said--.

In Col. 10, line 21 (Claim 7, line 13), after "at", insert --a--.

Signed and Sealed this

Twenty-sixth Day of October, 1993

Attest:

BRUCE LEHMAN

Attesting Officer

Commissioner of Patents and Trademarks